United States Patent
Fukunaga et al.

(10) Patent No.: US 6,282,240 B1
(45) Date of Patent: Aug. 28, 2001

(54) PICTURE CODER, PICTURE DECODER, AND TRANSMISSION SYSTEM

(75) Inventors: Shigeru Fukunaga; Toshihisa Nakai, both of Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 08/922,460

(22) Filed: Sep. 3, 1997

(51) Int. Cl.[7] ............................... H04B 1/66; H04N 7/12
(52) U.S. Cl. ............................. 375/240.01; 375/240.13
(58) Field of Search ........................ 348/384, 390, 348/400, 401, 402, 409, 415, 416, 419, 464, 442, 200, 699; 382/373, 232, 234, 233, 236, 238; 375/240, 240.1, 240.13, 240.15, 240.16, 240.17; H04B 1/66; H04N 7/12

(56) References Cited

U.S. PATENT DOCUMENTS

| | | |
|---|---|---|
| 4,422,171 | 12/1983 | Wortley et al. . |
| 4,901,313 | 2/1990 | Fujikura et al. . |
| 5,260,783 * | 11/1993 | Dixit ...................................... 358/136 |
| 5,414,717 | 5/1995 | Matsumoto et al. . |
| 5,457,808 | 10/1995 | Osawa et al. . |
| 5,528,284 | 6/1996 | Iwami et al. . |
| 5,537,409 * | 7/1996 | Moriyama et al. ..................... 370/84 |
| 5,565,921 * | 10/1996 | Sasaki et al. ......................... 348/409 |
| 5,568,200 * | 10/1996 | Pearlstein et al. .................... 348/426 |
| 5,572,333 * | 11/1996 | Moriyama et al. ..................... 386/98 |
| 5,598,216 * | 1/1997 | Lee ....................................... 348/416 |
| 5,631,644 * | 5/1997 | Katata et al. ........................... 341/67 |
| 5,731,850 * | 3/1998 | Maturi et al. .......................... 348/699 |
| 5,787,192 * | 7/1998 | Takachi et al. ........................ 382/166 |
| 5,796,436 * | 8/1998 | Shioi et al. ........................... 348/409 |
| 5,832,121 * | 11/1998 | Ando .................................... 382/236 |
| 5,847,763 * | 12/1998 | Mfatsumura et al. ............... 348/416 |
| 5,847,764 * | 10/1998 | Murakami ............................ 348/416 |
| 6,002,802 * | 12/1999 | Chujoh ................................. 382/236 |
| 6,081,296 * | 6/2000 | Funkunaga et al. ................. 348/415 |

FOREIGN PATENT DOCUMENTS

| | | | |
|---|---|---|---|
| 0763944A2 | 3/1997 | (EP) | ............................... H04N/7/50 |
| WO9530309 | 11/1995 | (WO) | ............................... H04N/7/26 |

OTHER PUBLICATIONS

Line Transmission of Non–Telephone Signals, Video Coding for Low Bitrate Communication, Draft ITU–T Recommendation H–263, International Telecommunication Union, (Dec. 5, 1995). pp. 1–49.

* cited by examiner

Primary Examiner—Chris Kelley
Assistant Examiner—Tung Vo
(74) Attorney, Agent, or Firm—Rabin & Champagne, P.C.

(57) ABSTRACT

A coder receives from a decoder the reception result of coded data, estimates the reception capability of the decoder and, based on the estimate result, updates accordingly the reference data on which prediction coding is to be based. This enables the reference data to be updated according to the reception capability of each decoder.

20 Claims, 12 Drawing Sheets

X : DROP-OUT

*Fig. 17*
| a | b | c | d | e | f | g | h | i | j | k |
|---|---|---|---|---|---|---|---|---|---|---|
| A | A | A | A | A | A | A | A | A | A | A |
| B |   |   |   | B |   |   |   | B |   |   |
*Fig. 18*
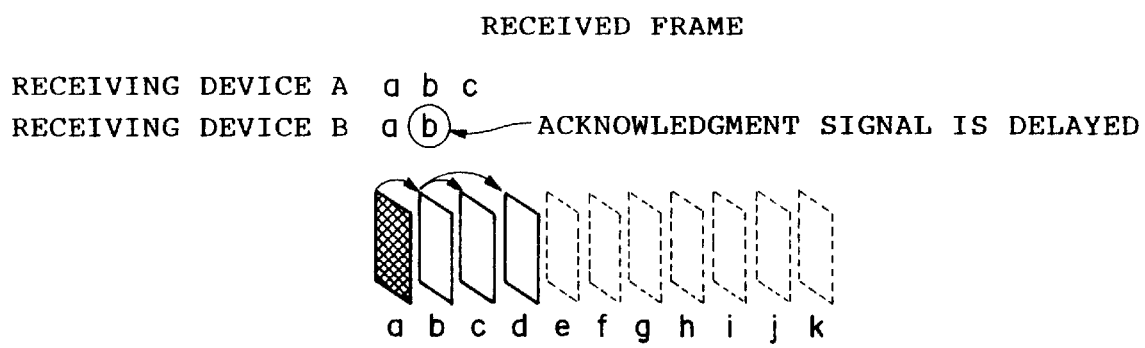
*Fig. 19*
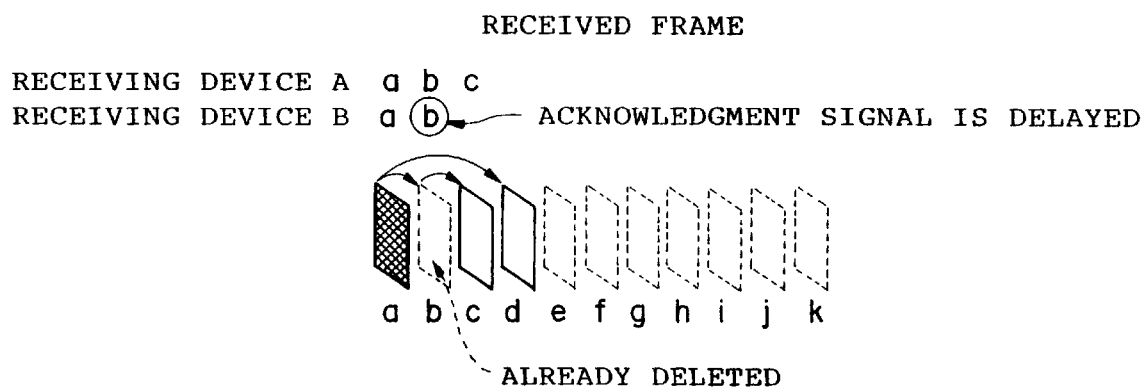

Fig. 21

RECEIVED FRAME

RECEIVING DEVICE A   a   b   c   d   e   f

RECEIVING DEVICE B   a       c       e

RECEIVING DEVICE C   a           d

TARGET DEVICE TABLE

| A | A | A | A | A | A |
|---|---|---|---|---|---|
| B |   | B |   | B |   |
| C |   |   | C |   |   |

WEIGHT   6         4   3   1

PICTURE CODER, PICTURE DECODER, AND TRANSMISSION SYSTEM

BACKGROUND OF THE INVENTION

1. Field of the Invention

The present invention relates to a picture transmission system, picture coder, and picture decoder, and more particularly to the prevention of picture quality degradation caused by frame dropouts or frame skipping.

2. Description of the Prior Art

Recently, there has been a proliferation of transmission systems that transmit picture signals over networks: examples include videotelephone, videoconferencing, and video-on-demand (VOD). To keep pace with the technical advances, standardization of the picture coding method is now in progress.

The picture coding method is classified into two: one is a coding method that employs both intra-frame coding and inter-frame coding and the other is a coding method that employs only intra-frame coding.

The method that employs both intra- and inter-frame coding has been used as a moving-picture communication/accumulation coding method proposed by the ITU-T Recommendation H.261 and Moving Picture Experts Group (MPEG). FIG. 2 is an example of frames arranged in time sequence. The coding method adopted by the ITU-T Recommendation H.261, shown in FIG. 2, performs intra-frame coding (I frames a and i) at regular intervals and, at other times, performs inter-frame coding for each of P frames (inter-frame coded frames, b–h, j–k) with reference to the immediately preceding frame to remove temporal redundancy. In the following discussion, a frame coded in the intra-frame coding method is referred to as an I frame, while a frame coded in the inter-frame coding method is referred to as a P frame.

On the other hand, the method that employs only intra-frame coding has been used as a still picture coding method such as that adopted by Joint Photographic Coding Experts Group (JPEG). This method performs intra-frame coding on all the frames, as shown in FIG. 3.

The method proposed by Recommendation H.261, which performs the inter-frame coding of each frame by referencing the immediately preceding frame, requires that all the frames be transmitted in the correct sequence. For a telephone line or an ISDN line over which data is transmitted after a connection with a partner is established, data reaches the partner without loss and in the correct sequence. However, for an Ethernet LAN or an ATM network in which data is divided into small units (called packets or cells) before transmission, there is a possibility that packets are lost or transmitted in an incorrect sequence.

In general, networks employ a protocol (for example, TCP Transmission Control Protocol) in which the transmitting device sends packets with attached serial numbers, and the receiving device rearranges the packets in the correct sequence, confirms their arrival, and sends requests for the retransmission of non-arriving packets back to the transmitting device in order to deal with these problems and increase network reliability.

However, when network operation is unstable and packets are dropped frequently, retransmission under this type of protocol can cause large cumulative delays to build up, which is inappropriate for the real-time transmission of moving pictures. In some cases, it is preferable to display new data, even if skipping of a frame, rather than retransmitting old data, especially when new data can be displayed immediately.

Broadcasting and multicasting are schemes which send data to a plurality of sites at one time. However, when packet dropout occurs during transmission of a packet to one of the sites, the above protocol requires that the same packet be sent even to those sites which have received the packet successfully, significantly increasing the network load. Broadcasting and multicasting are therefore performed using a protocol that does not re-transmit a packet, such as the User Datagram Protocol (UDP); as a result, the probability of packet dropout increases.

In wireless networks, the data error rate or data drop-out rate is high not only in packet transmission but also in established line transmission due to fading and so forth. In addition, when the errors exceed the error-correcting capability of the receiving device, some pieces of data are sometimes discarded to receive other pieces of data successfully. Data dropouts in wireless networks therefore tend to be larger than in wire networks.

Another problem is that the processing speed of the sending device is not always equal to that of the receiving device. For example, decoding all the frames on a slower receiving device would put much frame data in the wait state, causing long delays. This requires the receiving device to intentionally skip frames. However, when there is no decoding data for a frame preceding the current frame, as in the inter-frame coding method according to the prior art, the current frame cannot be decoded. Hence, this prevents free skipping of frames.

FIG. 4 shows an example of frame dropout that may occur during transmission of frames according to the protocol proposed by Recommendation H.261. When frame e is dropped out or cannot be decoded because of slow processing, the P frames (f, g, h) cannot be decoded until the next I frame, i, is received.

Thus, in order to send all the frames successfully in a network in which frame dropout or frame skipping occurs frequently, intra-frame coding such as JPEG is performed, instead of inter-frame coding, for all the frames. For example, even when frame e is dropped out in the JPEG coding shown in FIG. 5, the next and the following frames may be decoded successfully. However, the problems with this method, which does not use inter-frame coding, are that there is temporal redundancy, whereby coding and decoding are inefficient, thereby leading to necessity of transmitting a large amount of data.

Thus, there has been a desire for a coder and decoder which decodes P frames without having to wait for the next I frame and which prevents coding efficiency from being decreased even in an environment in which there is a possibility that frames are dropped out or skipped.

SUMMARY OF THE INVENTION

Therefore, the object of the present invention is to provide a picture coder system capable of transmitting pictures efficiently.

According to one aspect of the present invention, the picture coder system including a picture coder coding a plurality of frames of a picture in an inter-frame decoding mode based on a reference frame and a picture decoder decoding a frame in the inter-frame decoding mode based on the reference frame, wherein the picture decoder comprises notification means for notifying the picture coder of status information on a decoding capability of the picture decoder and the picture coder comprises status estimation means for estimating a status of the picture decoder based on the status information, and reference frame determination means for determining which frame of the plurality of frames is to be used as the reference frame.

BRIEF DESCRIPTION OF THE DRAWINGS

The present invention will be understood more fully from the detailed description and the accompanying drawings below of the preferred embodiments of the invention.

In the drawings:

FIG. 17 shows the target device table.

FIG. 18 is an example of picture coding in which the propagation delay is large.

FIG. 19 is an example of picture coding in which a frame is deleted too early.

FIG. 21 is an example of weights assigned to the entries of the target device table.

DESCRIPTION OF THE PREFERRED EMBODIMENTS

Referring to the attached drawings, there is shown the first embodiment according to this invention that is applied to the multipoint transmission of moving pictures.

<First embodiment>

In the multipoint transmission mode, a sending device of the transmission system in this embodiment uses the decoding status signal (hereinafter, referred to as acknowledgment signal), which is sent back from each receiving device to indicate that a frame has been received normally (or abnormally), to estimate the receiving capability of the receiving device. If the sending device finds that the receiving devices differ in the receiving capability, it selects those receiving devices capable of receiving the next frame before sending it, and selects and updates the reference frame accordingly.

A receiving device of the transmission system in this embodiment does not decode coded data not destined therefor and, when the user requests that the receiving capability of the device be changed, sends the request to the sending device.

That is, the transmission system in this embodiment updates a reference frame according to the capability of the receiving devices.

The following explains the configuration of a sending device and a receiving device of this transmission system.

Figure 1:
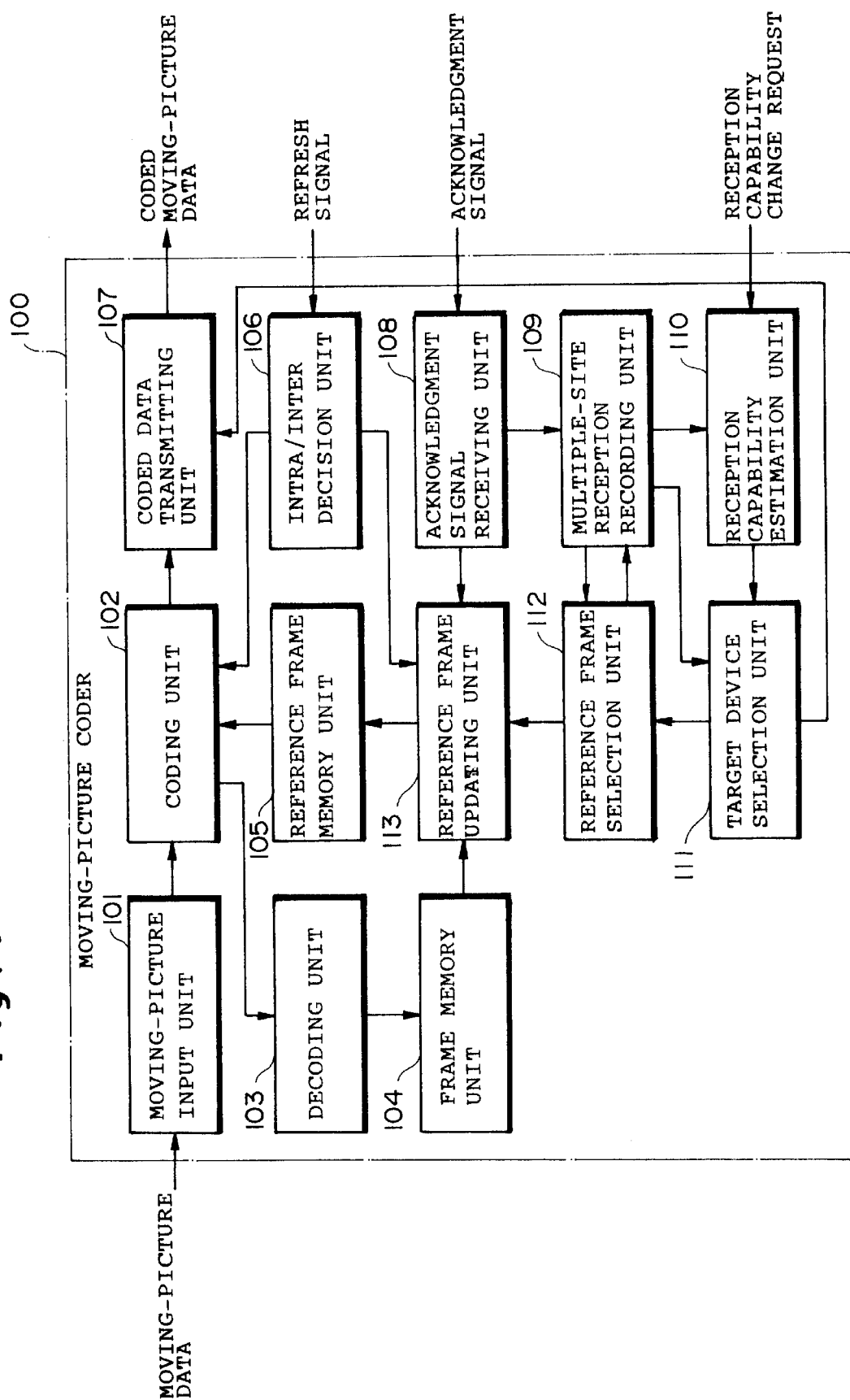
FIG. 1 is a functional block diagram of the moving-picture coder of the first embodiment.
Figure 2:
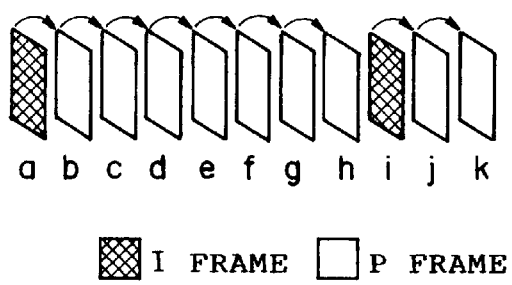
FIG. 2 shows an example of the coding method according to the Recommendation H.261.
Figure 3:
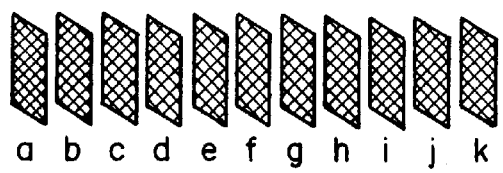
FIG. 3 shows an example of the coding method according to JPEG.
Figure 4:
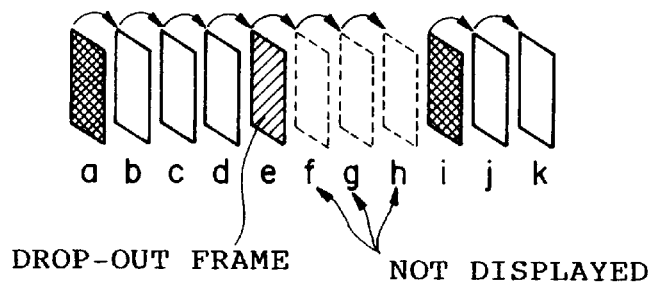
FIG. 4 shows an example of coding according to Recommendation H.261 in which frames are dropped out during coding.
Figure 5:
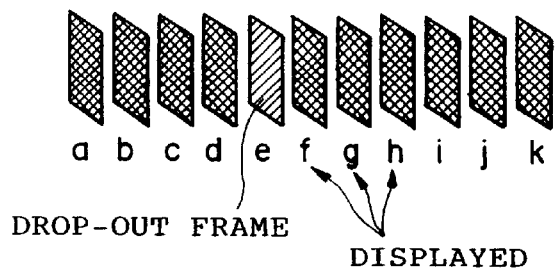
FIG. 5 shows an example of coding according to JPEG in which frames are dropped out during coding.

FIG. 1 is a functional block diagram of the moving-picture coder 100 used as a sending device of the transmission system in this embodiment.

A moving-picture input unit 101 passes moving-picture data from an input source, such as a camera, to a coding unit 102, one frame at one time.

The coding unit 102 codes inputted frame data, and passes coded data to a decoding unit 103 and a coded data transmitting unit 107. When coding, the coding unit 102 switches processing between intra-frame coding and inter-frame coding according to an instruction from a intra/inter decision unit 106, where "intra" refers to intra-frame coding and "inter" refers to inter-frame coding. When the coding unit 102 performs inter-frame coding, it references frame data stored in a reference frame memory unit 105.

The decoding unit 103 decodes coded data and writes decoded data, as well as frame numbers, into frame memory unit 104.

The frame memory unit 104 memorizes data for each frame. Each time a reference frame is updated by a reference frame updating unit 113, unnecessary data is cleared.

The reference frame memory unit 105, which contains reference frame data for use in inter-frame coding, is updated by the reference frame updating unit 113.

The intra/inter decision unit 106 selects which coding to use: intra-frame coding or inter-frame coding. Ordinarily, intra-frame coding is selected at regular intervals (e.g., once every thirty frames) while, at other times, inter-frame coding is selected. When the intra/inter decision unit 106 receives a refresh signal from a receiving device (moving-picture decoder 200 described later), it forces intra-frame coding and notifies implementation of the intra frame coding to the coding unit 102 and reference frame updating unit 113.

The coded data transmitting unit 107 sends coded moving-picture data to a plurality of receiving devices (moving-picture decoder 200). The coded data transmitting unit 107 multiplexes control information, such as an intra/inter flag or a reference frame number, as well as sending device information and receiving device information as necessary, onto the data. During multipoint transmission, the coded data transmitting unit 107 sends all the data to all the receiving devices. It may send data to selected devices when a target device selection unit 111 has selected some receiving devices. It may also multiplex target device information onto data.

An acknowledgment signal receiving unit 108 receives positive acknowledgment signal, which indicates which frames have been decoded, from the receiving device (moving-picture decoder 200), and passes the numbers of the acknowledged frames to the reference frame updating unit 113. During multipoint transmission, the acknowledgment signal receiving unit 108 passes that information to a multiple-site reception recording unit 109.

The multiple-site reception recording unit 109 stores data on the reception result of each receiving device, including which frames each receiving device has received or a propagation delay from the time coded data is received to the time the acknowledgment signal is received. It passes recorded data to a reception capability estimation unit 110, target device selection unit 111, and reference frame selection unit 112. Note that, when the reference frame selection unit 112 selects a frame all the receiving devices have already received, the old data preceding that frame may be cleared or saved for a specified period.

The reception capability estimate unit 110 calculates the average frame dropout probability of each receiving device based on the past reception result recorded in the multiple-site reception recording unit 109 to estimate the reception capability (frame rate or network propagation delay, etc.,), and passes the estimate result to the target device selection unit 111. The capability estimate may be made either once at a specified period of time after the start of communication or one or more times at a specified interval if the reception capability or network status is variable. When a reception capability change request is sent from the receiving device (moving-picture decoder 200), the reception capability estimate unit 110 makes a reception capability estimate according to the request. However, when a reception capability change request from the receiving device is difficult to implement, information to that effect may be sent back to the receiving device with no capability change.

The target device selection unit 111 selects the receiving devices that are judged capable of receiving the next frame, based on the reception capability estimate made by the reception capability estimate unit 110 using the result data recorded in the multiple-site reception recording unit 109. Normally, all the devices are assumed to be capable of receiving the next frame. However, when the receiving capability apparently differs among receiving devices and, therefore, some devices are assumed not to be able to receive it, the target device selection unit 111 selects those receiving devices that are determined to be capable of reception, and passes information on the selected devices to the reference frame selection unit 112 and the coded data transmitting unit 107.

The reference frame selection unit 112 selects the most commonly-received frame as the reference frame, based on the reception results of the devices selected by the target device selection unit 111. The reference frame selection unit 112 passes the selected frame number to the reference frame updating unit 113.

The reference frame updating unit 113 updates the reference frame memory, responsive to the instructions received from the intra/inter decision unit 106, acknowledgment signal receiving unit 108, and reference frame selection unit 112. Upon receiving an intra-frame coding instruction from the intra/inter decision unit 106, the reference frame updating unit 113 copies the data of the current frame from the frame memory unit 104 to the reference frame memory unit 105 and deletes all the frame data from the frame memory unit 104. Upon receiving a frame number from the acknowledgment signal receiving unit 108, the reference frame updating unit 113 copies the frame data with that number from the frame memory unit 104 to the reference frame memory unit 105 and deletes frame data up to and including the frame with that number from the frame memory unit 104. During multipoint transmission, the reference frame updating unit 113 copies the frame data with that number from the frame memory unit 104 to the reference frame memory unit 105, responsive to the instruction from the reference frame selection unit 112; at this time, it deletes frame data up to and including the frame with that number only when target devices are not selected.

Figure 6:
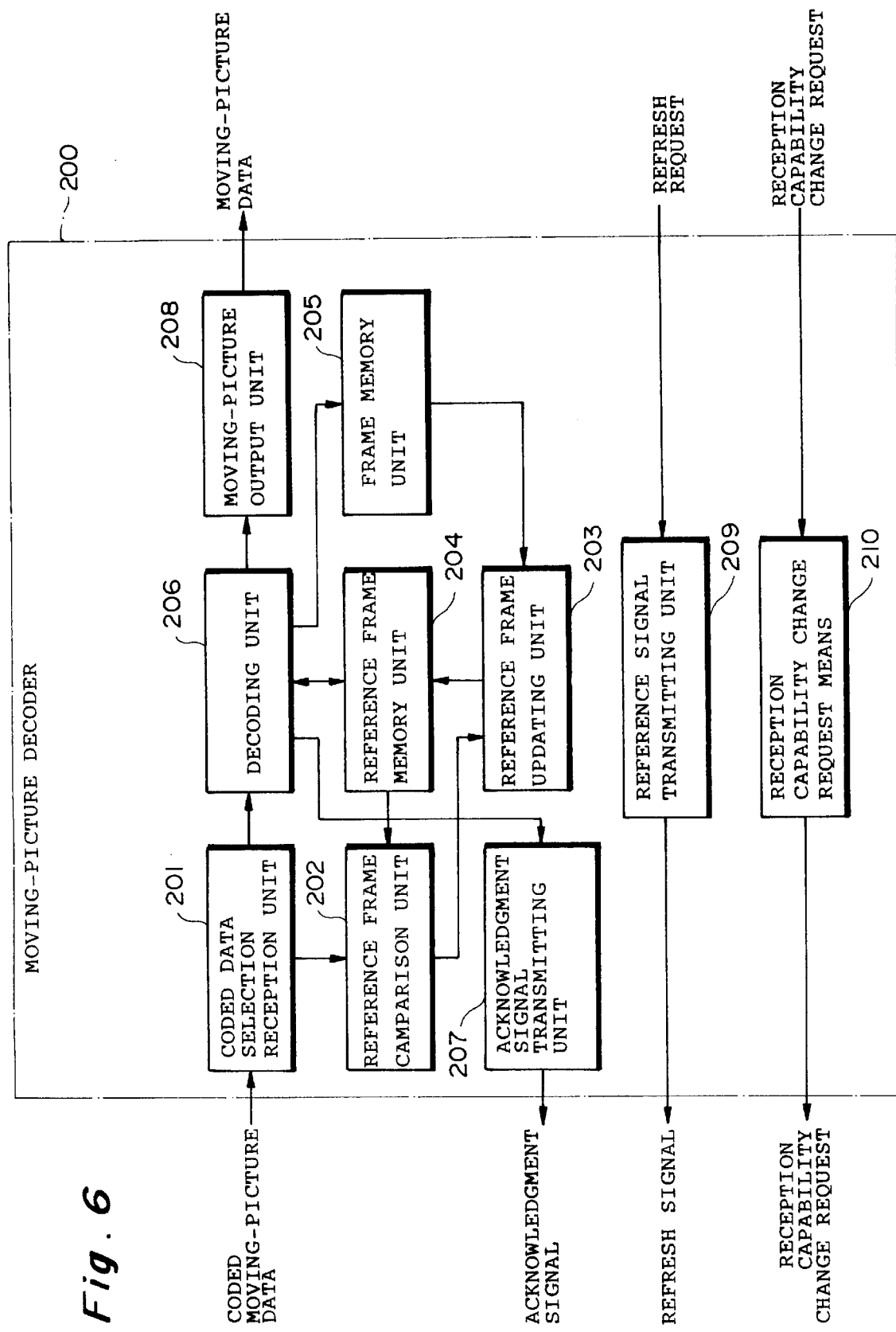
FIG. 6 is a functional block diagram showing the moving-picture decoder of the first embodiment.

FIG. 6 is a functional block diagram showing the configuration of the moving-picture decoder 200 that is used as a receiving device of the transmission system in this embodiment.

A coded data selection reception unit 201 receives coded moving-picture data from the sending device (moving-picture coder 100), and passes the received coded data, such information as the intra/inter flag and reference frame number multiplexed on the data and, as necessary, multiplexed sending device information and so forth to a decoding unit 206. It also passes the reference frame number to a reference frame comparison unit 202. When target device information is multiplexed during multipoint transmission, it sends that information to the reference frame comparison unit 202. When the device is not a target device, this unit discards the coded data and does not perform decoding for that frame.

The reference frame comparison unit 202 compares the received reference frame number with the reference frame number of its own that is stored in a reference frame memory unit 204. If they mismatch, the reference frame comparison unit 202 sends a reference frame update request and the new reference frame number to a reference frame updating unit 203. If there is target device information, the unit also sends it to the reference frame updating unit 203.

Upon receiving an update request from the reference frame comparison unit 202, the reference frame updating unit 203 reads the frame data of the new reference frame number from a frame memory unit 205 and writes the data and the frame number into the reference frame memory unit 204. At this time, if the target devices are not selected, the reference frame updating unit 203 deletes old frame data from the frame memory unit 205.

The reference frame memory unit 204, which contains the reference frame data for use in inter-frame coding, is updated by the reference frame updating unit 203 and the decoding unit 206.

The frame memory unit 205 contains the decoded frame data.

The decoding unit 206 decodes entered coded data and sends the decoded data to a moving-picture output unit 208. For an I frame, the decoding unit 206 writes the decoded data and the frame number into the reference frame memory unit 204 to update the reference frame; for a P frame, the decoding unit 206 references the data in the reference frame memory unit 204 for decoding and writes the decoded data and the frame number into the frame memory unit 205. When the decoding is done successfully, the decoding unit 206 passes the frame number to an acknowledgment signal transmitting unit 207.

The acknowledgment signal transmitting unit 207 sends an acknowledgment signal to the sending device (moving-picture coder 100) to indicate which frame has been decoded. It also sends the frame number received from the decoding unit 206.

The moving-picture output unit 208 outputs the decoded data received from the decoding unit 206 to the monitor.

A refresh signal transmitting unit 209 receives a refresh signal request from the user and sends the corresponding refresh signal to the sending device (moving-picture coder 100).

Upon receiving a reception capability change request from the user requesting that the reception capability of the receiving device estimated by the sending device be changed, reception capability change request means 210 send the reception capability change request to the sending device (moving-picture coder 100). When the user request exceeds the capability of the receiving device, the reception capability change request means 210 inform the user of the condition and do not send the change request.

The following explains how the moving-picture coder 100 and the moving-picture decoder 200 operate during multi-point transmission. The following divides the discussion of the operation into two: the operation performed for some time after the start of communication and the subsequent operation. In this discussion, assume that the two moving-picture decoders 200, A and B, are connected to the moving-picture coder 100.

First, the operation after the start of communication is explained. In this period of operation, the moving-picture coder 100 does not know the reception capability of the receiving devices connected to it. During this period, the moving-picture coder 100 checks the acknowledgment signal sent from each of receiving devices A and B, and updates the reference frame only when both receiving devices A and B have received the picture successfully.

Figure 7:
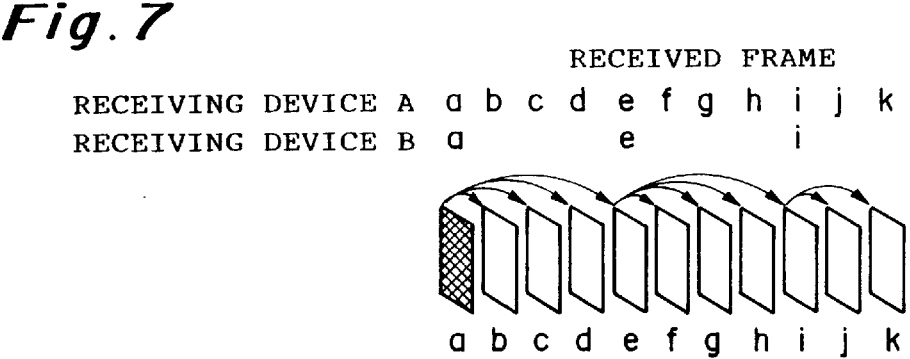
FIG. 7 shows an example of picture coding immediately after the start of multipoint transmission.

That is, as shown in FIG. 7, the moving-picture coder 100 updates the reference frame for frames a, e, and i, and performs coding for other frames b, c, d, f, g, h, j and k with reference to the reference frame at that point. In FIG. 7, the moving-picture coder 100 performs coding for frames b, c, and d with reference to frame a; frames f, g, and h with reference to frame e; and so forth.

Thus, in this period of frame coding, the reference frame is updated according to receiving device B that is relatively low in the reception capability.

This eliminates the need for performing intra-frame coding for all the frames against frame dropout and, at the same time, allows the P frames to be decoded without having to wait for the subsequent I frame, thus providing higher efficiency as compared with that of the conventional system. However, note that when receiving device A and receiving device B are largely out of synchronization in the reception timing or when the two devices differ largely in the reception capability, it is likely that the reference frame is updated less frequently. There're, continued use of this method may not provide a significant increase in efficiency.

Therefore, the reception result accumulated for some time after the start of communication is used. The estimate of the reception capability of receiving devices A and B, based on the reception result, is used to modify the frame coding method.

The reception capability estimate unit 110 is used to estimate the reception capability. In FIG. 7, the reception capability estimate unit 110 estimates that receiving device A can receive almost every frame but that receiving device B can receive, on the average. only one frame out of four frames that are sent to it.

Based on this result, the target device selection unit 111 judges that, after receiving-device B receives frame e, it cannot receive frames until frame i which is four frames ahead is sent. And, for frames f, g, and h that come before frame i, the target device selection unit 111 selects only receiving device A as the device which performs the coding of those frames.

Figure 8:
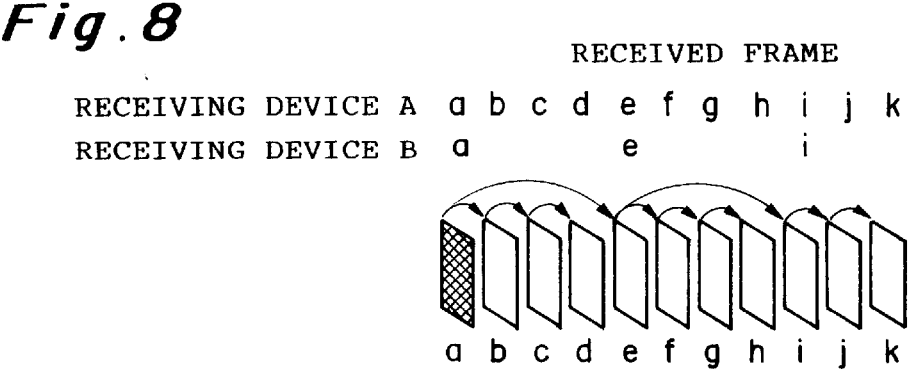
FIG. 8 shows an example of picture coding after a specified period time has elapsed since the start of multipoint transmission.

That is, as shown in FIG. 8, the reference frame is updated for each frame for receiving device A which receives every frame. And, the reference frame is set to frame e only when frame i, which is thought to be received by both receiving devices, is coded.

Thus, the coding efficiency of receiving device A, which is lower than when only receiving device A is connected but is higher than that of receiving device B, becomes still higher as compared with that for a period after the start of communication.

Figure 9:
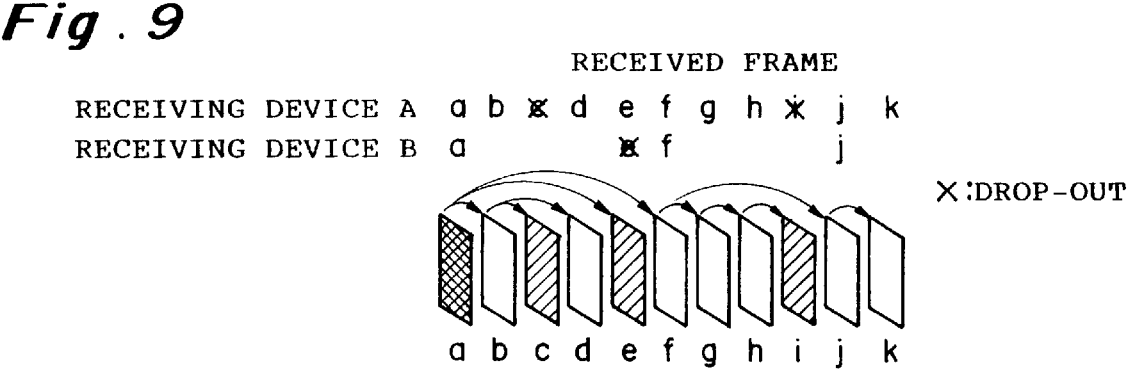
FIG. 9 shows an example of frame dropout during multipoint transmission.

FIG. 9 shows a dropout that may occur during this coding. When a dropout occurs (frames c, e, and i in the figure), the acknowledgment signal receiving unit 108 detects it, and the coding of the next frame is performed without updating the reference frame. This minimizes the degradation of picture quality, if any.

Figure 10:
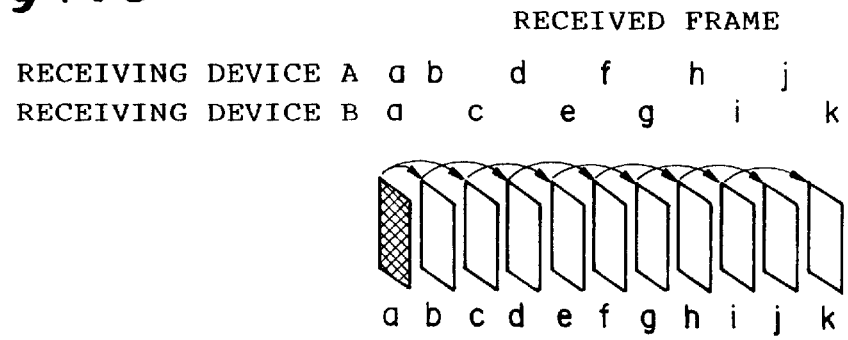
FIG. 10 shows an example of multipoint transmission in which two receiving devices are not synchronized in the reception timing.
Figure 11:
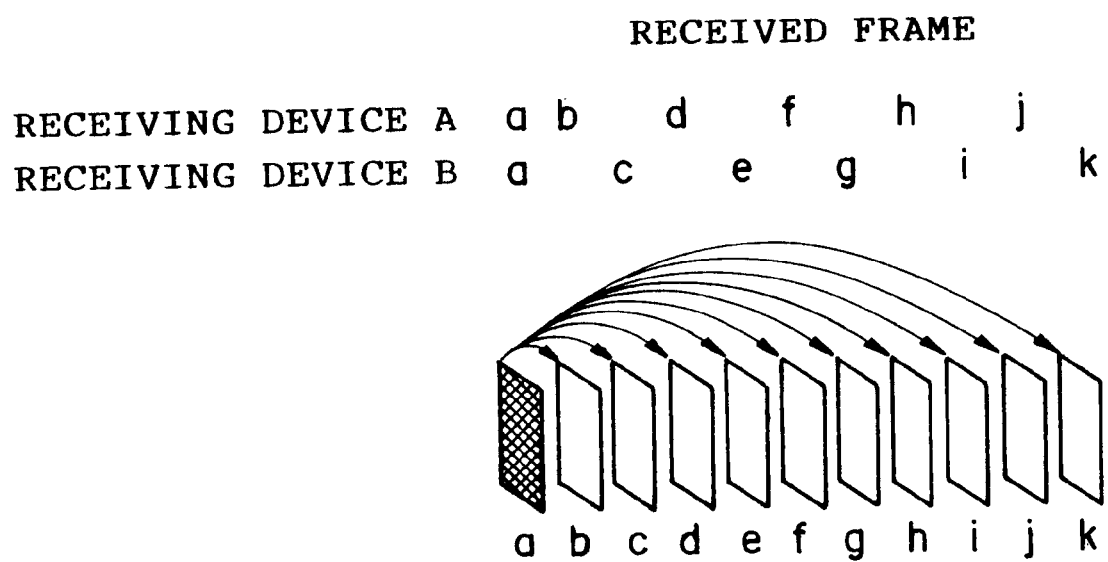
FIG. 11 shows another example of multipoint transmission in which two receiving devices are not synchronized in the reception timing.

FIG. 10 shows an example of coding when both receiving devices do not synchronize in the reception timing. In this case, because each frame is made to correspond to a receiving device, the reference frame of each receiving device is updated. Therefore, the coding efficiency is higher than when only the frame received by both receiving devices is used as a reference frame (FIG. 11).

The above configuration, in which the reference frame is updated according to the reception result of each receiving device, makes it possible for the receiving device to decode all the frames without having to wait for the next I frame to be sent, increasing coding efficiency.

In addition, the sending device, with a function which estimates the reception capability of each receiving device, enables frame coding and data transmission best suited for each receiving device.

This is most significant in multipoint transmission. That is, in a configuration in which a plurality of receiving devices, each with its own reception capability, are connected to one communication line, a high capability receiving device can maintain high coding efficiency without being affected by a low capability receiving device.

In addition, even when a plurality of receiving devices do not synchronize in the reception timing, the reference frame of each device may be updated independently and therefore high coding efficiency is ensured.

<Second embodiment>

Next, the following explains the second embodiment. The second embodiment differs from the first embodiment in that, when a plurality of receiving devices receive picture data from the sending device, the second embodiment has means for grouping those receiving devices with an equal reception capability and means for sending a frame to the receiving devices in the same group in the same timing in order to reduce the transmission processing load.

Figure 12:
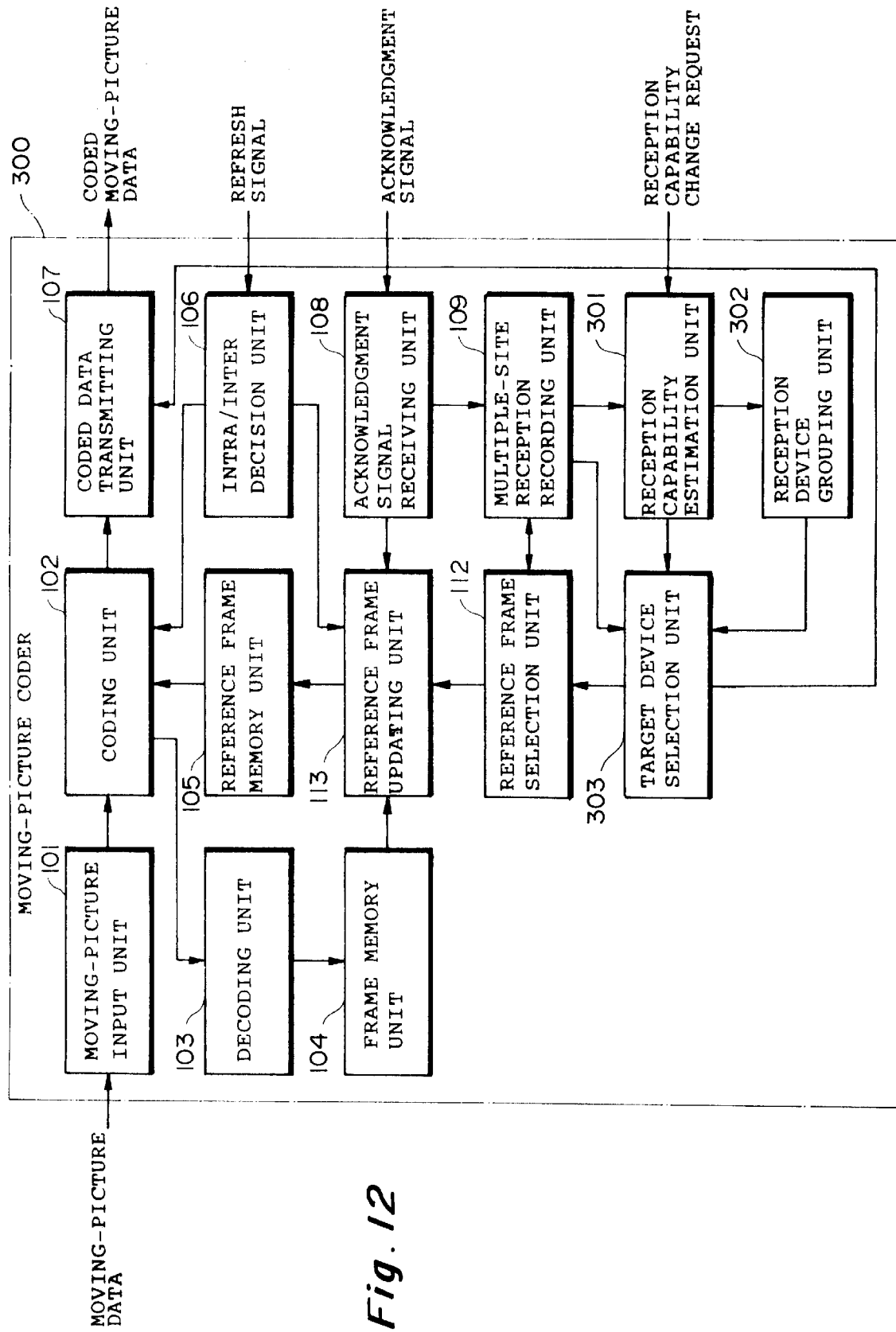
FIG. 12 is a functional block diagram showing the moving-picture coder of the second embodiment.
Figure 13:
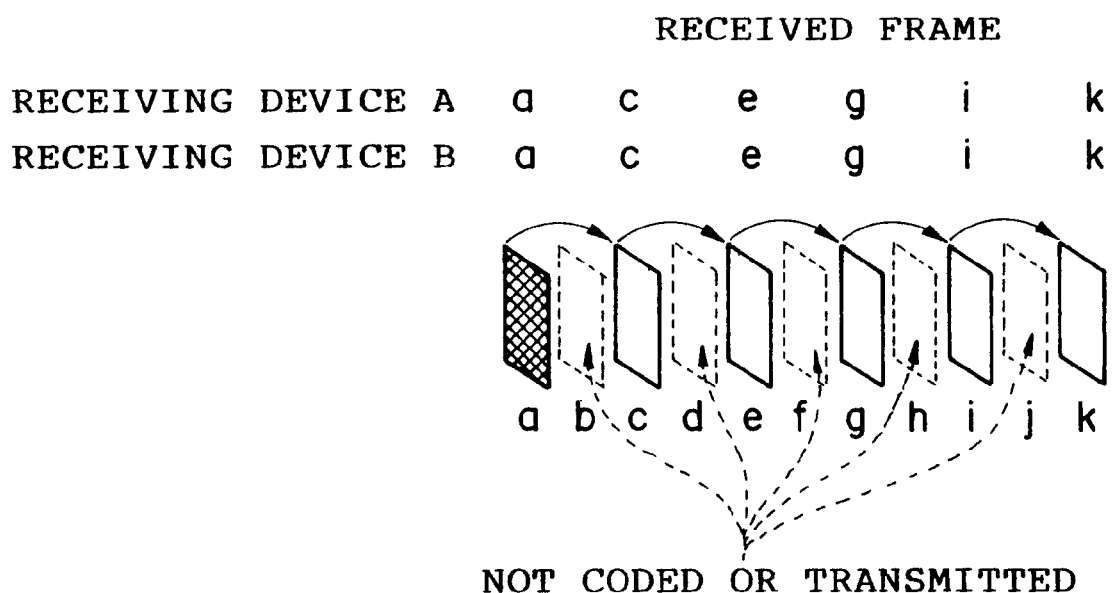
FIG. 13 shows an example of moving-picture coding during multipoint transmission.

FIG. 12 is a functional block diagram showing an example of the moving-picture coder 300 in the second embodiment. In FIG. 12, the same components as those shown in FIG. 1 have the corresponding numbers used in FIG. 1. The description of those components is omitted.

A reception capability estimate unit 301, functionally equivalent to the reception capability estimate unit 110 in the first embodiment, passes the estimate result to a target device selection unit 303 and, at the same time, to a reception device grouping unit 302.

The reception device grouping unit 302 divides the receiving devices into a plurality of groups by capability according to the reception capability estimated by the reception capability estimate unit 301, and passes the grouped result to the target device selection unit 303.

The target device selection unit 303, functionally equivalent to the target device selection unit 111 in the first embodiment, selects the receiving devices in the same group in the same timing, based on the grouping result of the reception device grouping unit 302 This ensures that the coded data is always sent to the receiving devices in the same group at the same time.

The configuration of the a receiving device, that is, a moving-picture decoder, is the same as that used in the first embodiment.

A decrease in the coding efficiency caused by the two receiving devices not being synchronized may be avoided by the moving-picture coder 100 in the first embodiment. However, the operation of the moving-picture coder 100 is somewhat redundant because it repeats coding and transmission alternately in the same timing.

Thus, the moving-picture coder 300 in the second embodiment groups the receiving devices A and B to send coded data in the same timing.

This eliminates the redundancy of the sending device, thereby increasing processing efficiency.

Figure 14:
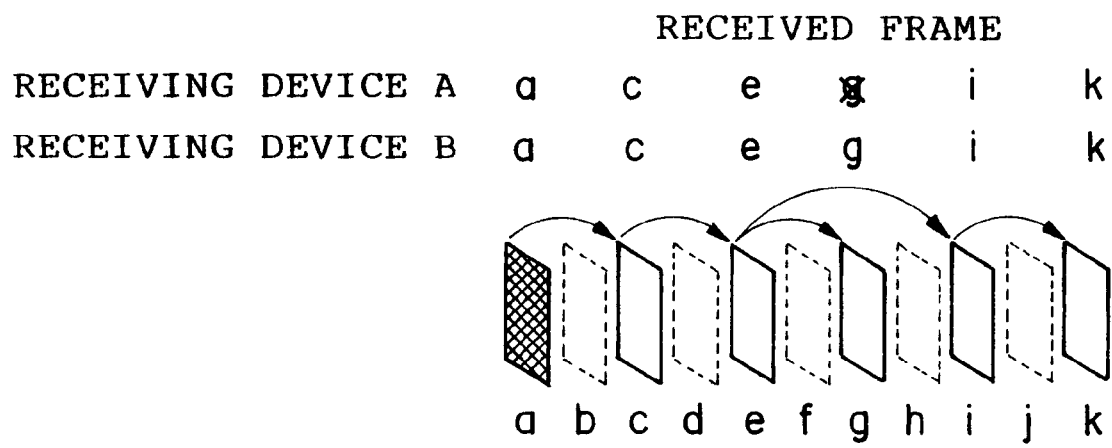
FIG. 14 shows an example of frame dropout during multipoint transmission.

FIG. 14 shows an example of frame dropout. In this case, even when a dropout occurs, the picture quality is not degraded much because frame coding is performed without updating the reference frame. In this embodiment, the receiving devices in the same group are treated in the same manner.

As described above, the second embodiment provides the same advantage as the first embodiment as well as the following two advantages which are specific to the second embodiment. First, grouping the receiving devices by reception capability allows coding and transmission to be synchronized, eliminating processing redundancy. Second, grouping the devices by reception capability significantly reduces the number of combinations of devices during target device selection processing, making processing simple.

<Third embodiment>

The third embodiment is described below. The third embodiment differs from the first embodiment in that the sending device has means for recording which receiving device used which frame data, stored in this sending device, as a reference frame, means for selecting an unnecessary frame from those frames each associated with one or more receiving devices, means for deleting selected frame data from frame memory, and means for sending the number of an unnecessary frame to the receiving device and in that the receiving device has means for receiving the number of an unnecessary frame and means for deleting the unnecessary frame. In this embodiment, frame data which may be used as reference data but which is already unnecessary is deleted according to the capability of the receiving device.

Figure 15:
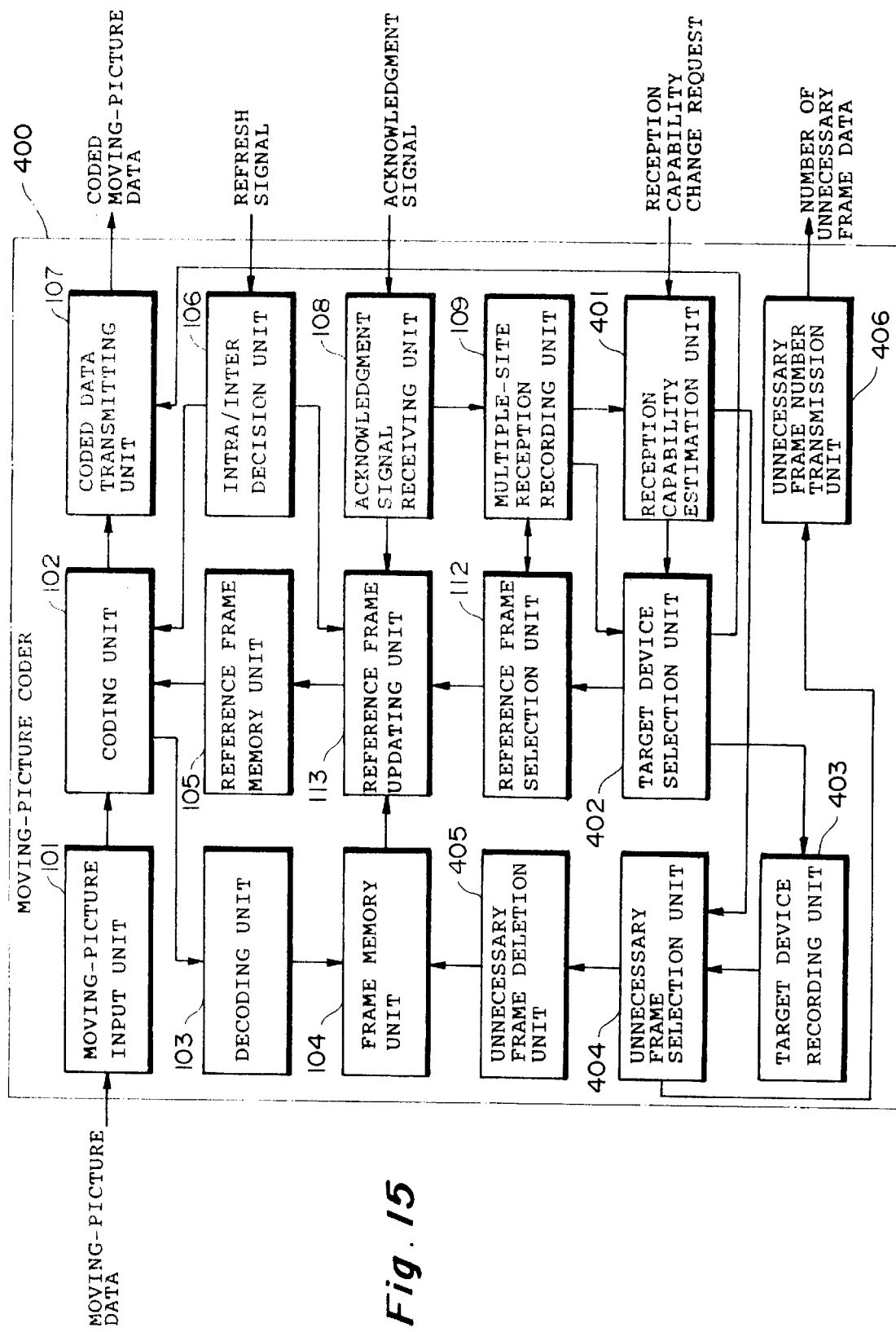
FIG. 15 is a functional block diagram showing the moving-picture coder of the third embodiment.

FIG. 15 is a functional block diagram showing an example of the moving-picture coder 400 in the third embodiment. In FIG. 15, the same components as those shown in FIG. 1 have the corresponding numbers used in FIG. 1. The description of those components is omitted.

A reception capability estimate unit 401, functionally equivalent to the reception capability estimate unit 110 in the first embodiment, passes the estimate result to a target device selection unit 402 and, at the same time, to a unnecessary frame selection unit 404.

The target device selection unit 402, functionally equivalent to the target device selection unit 111 in the first embodiment, passes selected target device data to the reference frame selection unit 112 and, at the same time, to a target device recording unit 403.

The target device recording unit 403 records which device used which frame data, stored in the frame memory unit 104, as a reference frame and passes recorded data to an unnecessary frame selection unit 404. Note that information on target devices may be stored in a special table or added to the header information of the frame memory unit 104.

Based on the reception capability, the unnecessary frame selection unit 404 selects from recorded frame data an unnecessary frame not to be used as a reference frame, and passes the number of the selected frame to an unnecessary frame deletion unit 405. If the receiving device is compatible with this function, the unnecessary frame selection unit 404 passes the number also to an unnecessary frame number transmission unit 406.

The unnecessary frame deletion unit 405 deletes unnecessary frame data from the frame memory unit 104 according to an instruction from the unnecessary frame selection unit 404.

The unnecessary frame number transmission unit 406 sends the number of unnecessary frame data to the receiving device as necessary.

Figure 16:
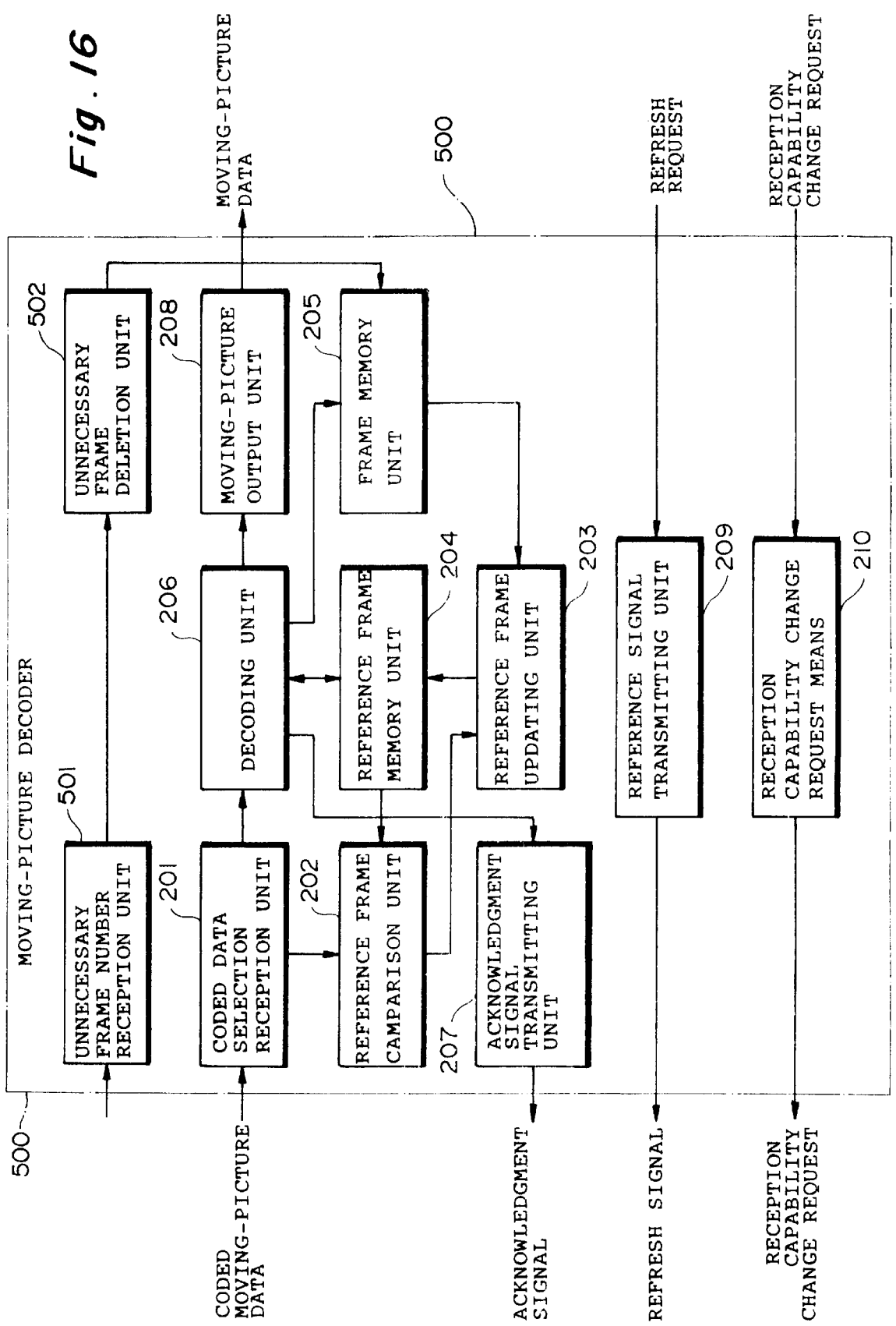
FIG. 16 is a functional block diagram showing the moving-picture decoder of the third embodiment.

FIG. 16 is a functional block diagram showing an example of the moving-picture decoder 500 in the third embodiment. In FIG. 16, the same components as those shown in FIG. 6 have the corresponding numbers used in FIG. 6. The description of those components is omitted.

An unnecessary frame number reception unit 501 receives the number of unnecessary frame data from the unnecessary frame number reception unit 501 an necessary, and passes the received number to an unnecessary frame deletion unit 502.

The unnecessary frame deletion unit 502 deletes unnecessary data from the frame memory unit 205 as necessary.

The following explains an example of operation in the third embodiment with reference to the example used in the first embodiment:

As shown in FIG. 17, the target device recording unit 403 records which receiving device used which frame as a reference frame. Based on this target device table, the unnecessary frame selection unit 404 selects an unnecessary frame.

For example, frame a, which is referenced by receiving devices A and B, cannot be deleted until frame e, which is also referenced by receiving devices A and B, is coded. On the other hand, frame b, which is referenced only by receiving device A, may be deleted after frame c, which is also referenced only by receiving device A, is coded.

Recording the devices selected in the past as in this embodiment allows a frame used by the same device to be serially deleted.

However, note that the following problem may develop when frame b is deleted. For example, assume that the acknowledgment signal of frame b is delayed and is received from receiving device B immediately before frame d is coded because of a large propagation delay on receiving device B. In this case, if the frame data is still available as in FIG. 18, frame d may be coded with reference to frame b. However, if frame b was deleted when frame c was coded as explained above, the reference frame must be returned to frame a as in FIG. 19 even if both receiving device A and receiving device B have received frame b.

To prevent this problem, the unnecessary frame selection unit 404 in this embodiment selects an unnecessary frame not only by referencing the target device table but also by considering the reception capability of each receiving device. That is, the unnecessary frame selection unit 404 deletes frame b considering the reception capability of receiving device B.

For example, when receiving device B receives one frame out of four frames as shown in FIG. 8, the unnecessary frame selection unit 404 selects frame b for immediate deletion. On the other hand, when the propagation delay of the acknowledgment signal of receiving device B is assumed to be large, the unnecessary frame selection unit 404 waits the maximum propagation delay time before selecting frame b for deletion.

As described above, the third embodiment provides the same advantage as the first embodiment as well as the following two advantages which are specific to the third embodiment. First, the reference frames selected for some devices may be serially deleted and, therefore, memory may be saved. Second, frames are not deleted too early because they are selected for deletion considering the reception capability. <Fourth embodiment>

The fourth embodiment is described below from the viewpoint of the difference between the fourth embodiment and the third embodiment. The fourth embodiment differs from the third embodiment in that the sending device has frame data weighting means for weighting frame data according to the target device and means for deleting frame data from frame memory according to the weight. When necessary frames must be deleted, for example, in a small-memory system, memory deletion is controlled so that the most important frame data is deleted last.

Figure 20:
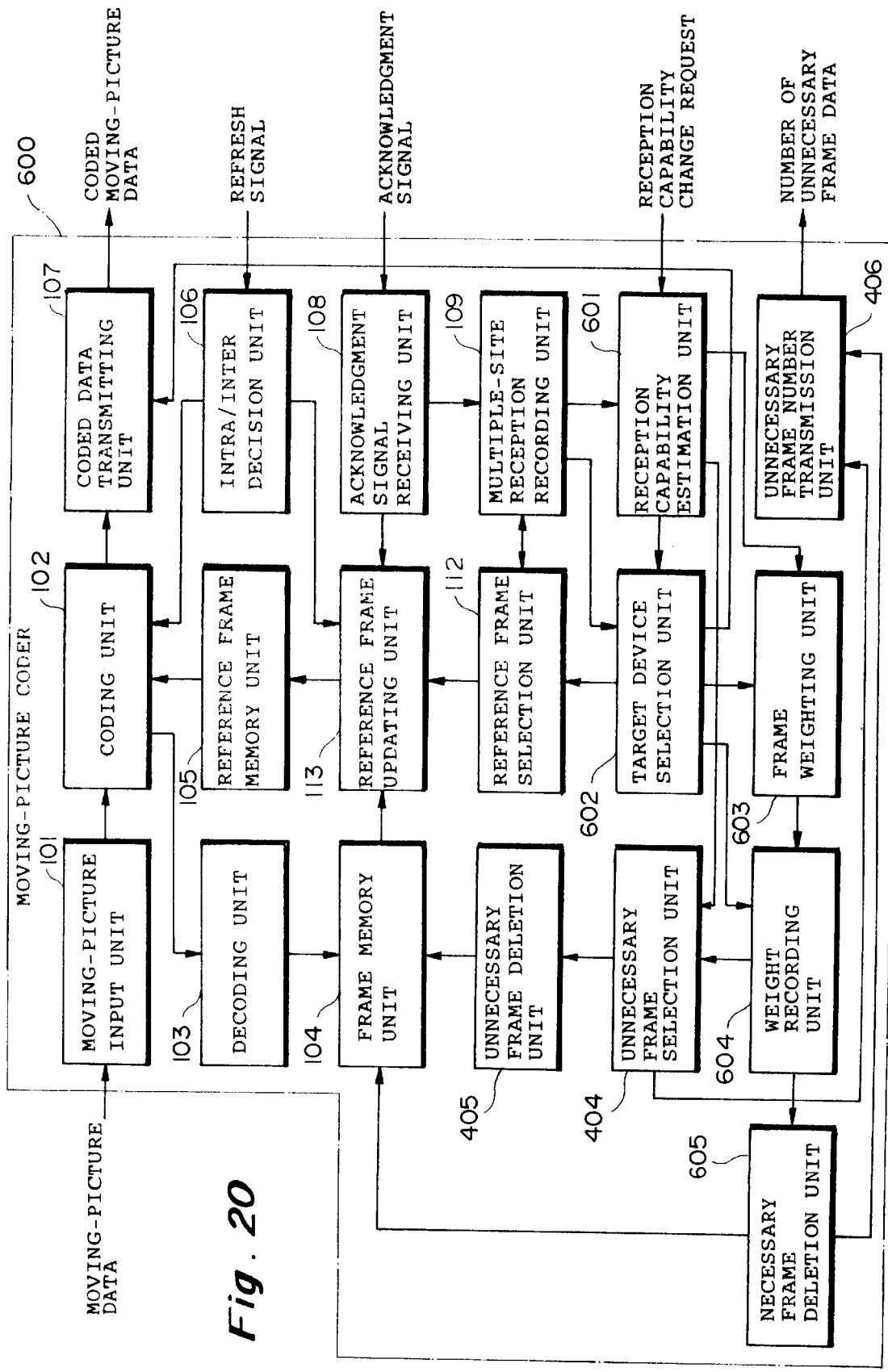
FIG. 20 is a functional block diagram showing the moving-picture coder of the fourth embodiment.

FIG. 20 is a functional block diagram showing an example of the moving-picture coder 600 in the second embodiment. In FIG. 20, the same components as those shown in FIG. 15 have the corresponding numbers used in FIG. 15. The description of those components is omitted.

A reception capability estimate unit 601, functionally equivalent to the reception capability estimate unit 401 in the third embodiment, passes the estimated reception capability to a target device selection unit 602 and the unnecessary frame selection unit 404 and, at the same time, to a frame weighting unit 603.

The target device selection unit 602, functionally equivalent to the target device selection unit 402 in the third embodiment, passes selected device data to the reference frame selection unit 112 and a weight recording unit 604 and, at the same time, to the frame weighting unit 603.

The frame weighting unit 603 calculates a weight indicating the importance of frame data according to the number and capability of selected target devices, and records the calculated weight in the weight recording unit 604.

The weight recording unit 604, functionally equivalent to the unnecessary frame selection unit 404 in the third embodiment, records the weight of each frame determined by the frame weighting unit 603. The weight recording unit 604 passes recorded data to the unnecessary frame selection unit 404 and, at the same time, to a necessary frame deletion unit 605.

The necessary frame deletion unit 605 deletes frame data from the frame memory unit 104, according to the frame weight data recorded in the weight recording unit 604, when the necessary frame data must be deleted. When the receiving device is compatible with this function, the necessary frame deletion unit 605 sends this deletion data to the unnecessary frame number transmission unit 406.

The receiving device, that is, moving-picture decoder, used in this embodiment is similar in configuration to the moving-picture decoder 500 used in the third embodiment.

When frame data must be deleted in a system where the frame memory is insufficient, the moving-picture coder 600 used in this embodiment allows the user to efficiently delete frame data with the least important frame first. The following explanation focuses on this point.

FIG. 21 shows an example of weight on each frame. In FIG. 21, receiving device A receives every frame, receiving device B every other frame, and receiving device C every third frame.

At this time, the moving-picture coder 600 creates a target device table based on the reception result, as in the third embodiment, and, based on this table, deletes a reference frame. In FIG. 21, the shaded frame data has been deleted assuming that it is no longer necessary.

The operation of the moving-picture coder 600 is explained below under the assumption described above. First, the moving-picture coder 600 puts weight on each receiving device. The weight of 1 is assigned to the receiving device with the highest reception capability, with a higher weight assigned to a device with lower capability considering the power or the frame rate. In FIG. 21. the weight of 1 is assigned to receiving device A, the weight of 2 to receiving device B, and weight of 3 to receiving device C.

Next, the moving-picture coder 600 calculates the total of the weights for each frame, which is the weight of a frame. The more the receiving devices, the larger the weight of the frame; the lower the capability of the receiving device, the larger the weight of the frame. This is because a device with a higher capability is likely to find an alternative frame.

At deletion time, frames are deleted in order of ascending weight and, among frames with an equal weight, in order of reception time.

Deleting frames according to this rule prevents an important frame from being deleted even if it is old. For example, in FIG. 21, if the frames are deleted in order of reception time without considering the weight, the frame selected for the three receiving devices, A, B, and C, is deleted first. If this happens, the frame cannot be referenced when coding is performed later for devices A, B, and C.

In contrast, even if the frame selected for receiving devices A and B or the frame selected for receiving devices A and C is deleted first according to this rule, the frame selected for receiving devices A, B, and C may be used as an alternative frame. This minimizes the effect of deletion.

As described above, the fourth embodiment provides the same advantage as the first and the third embodiments as well as the following two advantages which are specific to the fourth embodiment. First, deleting frames with the least important frame first provides the user with coding efficiency dependent on the amount of frame memory, giving him or her a picture quality best suited to the system. Second, the survival of the most important frame, which is received by all the receiving devices, minimizes the possibility of coding errors.

<Other embodiments>

In the description of the third and fourth embodiments, the difference from the first embodiment is explained with the system configuration of the first embodiment as the base configuration. They may also be implemented with the system configuration of the second embodiment as the base configuration. The advantages in the second embodiment may be provided in each of the third and fourth embodiments.

In the third and fourth embodiments, the sending device judges that a frame is unnecessary and sends the number of the frame to the receiving devices to cause them to delete the frame. It is to be understood that the invention is not limited to this configuration. That is, a receiving device may perform the same processing as the sending device to select an unnecessary frame.

In the above description, the reference frame is switched for a frame when a frame dropout occurs. It is to be understood that the invention is not limited to frame switching for a frame. For example, a frame may be divided into a plurality of groups, and the reference frame may be switched for each block by checking to see if each block is dropped out. A smaller block reduces dropouts or errors, increasing the reference frame update rate and coding efficiency.

In the above description, the reference frame updating unit 113 copies frame data from the frame memory unit 104 to the reference frame memory unit 105 during intra-frame coding. It is to be understood that the invention is not limited to this method. For example, the intra-frame coding request signal may be passed from the intra/inter decision unit 106 to the decoding unit 103 to write frame data from the decoding unit 103 directly into the reference frame memory unit 105 during intra-frame coding. In this case, copying processing may be omitted.

In the above description, the reference memory and the frame memory are provided separately and explained separately. It is to be understood that the invention is not limited to this method. That is, with frame data in memory, a reference frame may be addressed with a pointer and so forth pointing to its memory location. This method eliminates the need for copying data from the frame memory to the reference frame memory when the reference frame is updated; only the contents of the pointer need be changed.

In the above description, the acknowledgment signal is sent when a frame is received. It is to be understood that the invention is not limited to this method. That is, the acknowledgment signal may be sent from the receiving device to the sending device when a frame cannot be received. This method enables the sending device to perform coding without having to wait for the acknowledgment signal to arrive because it is usually not sent. When the acknowledgment signal, which indicates that a frame cannot be received, is received, coding is performed by returning the reference frame to the frame immediately preceding the frame not successfully received. In this case, although the receiving device cannot decode several frames following the frame not received, it can resume decoding because the data is switched immediately to the one referencing the received frame.

In the above description, a receiving device (that is, a moving-picture decoder) sends the acknowledgment signal upon termination of decoding. It is to be understood that the invention is not limited to this method. That is, the data validity check may be made when coded data is received in order to send the acknowledgment signal if the data is valid. This sends the acknowledgment signal sooner and reduces the propagation delay of the acknowledgment signal.

In the above description, multipoint transmission in which a plurality of receiving devices are connected to one sending device is explained. It is to be understood that this invention may also be applied to a one-to-one connection configuration in which a reception acknowledgment signal delay is caused by network congestion and the reference frame cannot be updated for each frame.

In the description, the moving-picture coder and the moving-picture decoder each are represented by functional blocks. Either a hardware unit or a software program with this function may be used to implement this invention.

Although the invention has been described as transmitting moving-picture data, it can be applied to any type of data including voice data or binary data.

Although the invention has been described as a transmitting system composed of moving-picture coders and moving-picture decoders, it can be applied to coders and decoders for storing picture or the like.

As described above, the coder according to this invention receives the coded-data reception result from a decoder, estimates the reception capability of the decoder based on the result, and updates the reference data on which prediction coding is to be based. This makes it possible for the coder to update reference data according to the reception capability of each decoder and to select reference data best suited for the transmission data, thus maintaining high coding efficiency.

In addition, when the decoder according to this invention receives a reception capability change request or when the reception capability of the decoder is changed, the decoder can send information on the change to the coder from which coded data is sent. This allows the coder to perform coding depending upon the change in capability of each decoder.

Thus, a transmission system composed of these coders and decoders ensures coding efficiency higher than that of the conventional system.

What is claimed is:

1. A picture coder system including a picture coder coding a plurality of frames of a picture based upon a reference frame when said picture coder is in an inter-frame coding mode, and a picture decoder decoding the plurality of frames based upon the reference frame when said picture decoder is in the inter-frame coding mode, wherein the picture decoder comprises:
   a reception unit receiving coded data and a reference frame number from the picture coder,
   a decoding unit decoding the received coded data using a reference frame designated by the received reference frame number in the inter-frame coding mode,
   an acknowledgment unit generating an acknowledgment signal indicating the decoding status and a corresponding frame number of received coded data; and the picture coder comprises:
   an acknowledgment signal receiving unit receiving the acknowledgment signal and the corresponding frame number from the picture decoder,
   a frame memory storing frames and the corresponding frame number for each of the stored frames,
   a capability estimation unit estimating a decoding capability of the picture decoder based upon the indicated decoding status,
   a reference frame selection unit selecting a previously stored reference frame in the frame memory using the estimated decoding capability and the frame number of the received coded data,
   a coding unit coding data and, responsive to selection of a previously stored reference frame, said coding unit coding data using an updated reference frame in the inter-frame coding mode, and
   a transmitting unit transmitting coded data and an updated reference frame number.

2. A picture coder system as set forth in claim 1, wherein the acknowledgement signal represents which of the plurality frames is actually decoded by the picture decoder.

3. A picture coder system as set forth in claim 1, wherein the picture coder system has a plurality of picture decoders each having an acknowledgment unit generating an acknowledgment signal indicating decoding status and the corresponding frame number of the received coded data, and the picture coder further comprises:
- a selection unit selecting a picture decoder capable of receiving a given frame of a plurality of frames among the plurality of picture decoders based upon the estimated decoding capabilities of the plurality of picture decoders; and
- the data transmitting unit transmits the given frame to the selected picture decoders.

4. A picture coder system as set forth in claim 1, wherein the picture coder system has a plurality of picture decoders each having an acknowledgment unit generating an acknowledgment signal indicating the decoding status and indicating the corresponding frame number of the received coded data, the frame selection unit determines each reference frame suited for decoding in each of the plurality of picture decoders based upon decoding capabilities; and
- the transmitting unit transmits each reference frame to each of the plurality of picture decoders.

5. A picture coder system as set forth in claim 1, wherein the picture coder system has a plurality of picture decoders each having
- an acknowledgment unit generating an acknowledgment signal indicating the decoding status and indicating the corresponding frame number of the received coded data; and the acknowledgment signal represents which of the plurality of frames is actually decoded by a corresponding one of the plurality of picture decoders, and
- the frame selection unit selects a frame commonly decoded by the plurality of picture decoders as the reference frame.

6. A picture coder system as set forth in claim 1, wherein the picture coder system has a plurality of picture decoders each having an acknowledgment unit generating an acknowledgment signal indicating the decoding status and indicating the corresponding frame number of the received coded data; and
- the picture coder further comprises:
  - a grouping unit grouping the plurality of picture decoders into a plurality of groups based upon decoding capabilities; and
  - the transmitting unit transmits to each of the plurality of groups, each given frame of the plurality of frames suited therefor.

7. A picture coder which codes a plurality of frames of a picture based upon a reference frame when said picture coder is in an inter-frame coding mode and transmits the plurality of frames to a picture decoder which decodes the plurality of frames based upon the reference frame when said picture decoder is in the inter-frame coding mode, said picture coder comprising:
- an acknowledgment signal receiving unit receiving an acknowledgment signal indicating decoding status and for receiving a corresponding frame number of received coded data from the picture decoder,
- a frame memory storing frames and the corresponding frame number for each said frame,
- a capability estimation unit estimating a decoding capability of the picture decoder based upon the indicated decoding status,
- a reference frame selection unit selecting a previously stored reference frame in the frame memory using the estimated decoding capability and the frame number of the received coded data,
- a coding unit coding data, responsive to selection of each previously stored reference frame, said coding unit using an updated reference frame in the inter-frame coding mode, and
- a transmitting unit transmitting coded data and an updated reference frame number.

8. A picture coder as set forth in claim 7, wherein the acknowledgment signal represents which of the plurality frames is actually decoded by the picture decoder.

9. A picture coder as set forth in claim 7, further comprising a target selection unit selecting a picture decoder capable of receiving a given frame of the plurality of frames among a plurality of picture decoders, based upon decoding capabilities; and
- the transmitting unit transmits the given frame to the selected picture decoder.

10. A picture coder as set forth in claim 7, wherein the frame selection unit determines each reference frame suited for decoding in each of a plurality of picture decoders, based upon decoding capabilities; the picture coder further comprises the transmitting unit transmitting each reference frame to each of the plurality of picture decoders.

11. A picture coder as set forth in claim 7, wherein the acknowledgment signal represents which of a plurality of frames is actually decoded by each of a plurality of picture decoders, and
- the frame selection unit selects a frame commonly decoded by the plurality of picture decoders as the reference frame.

12. A picture coder as set forth in claim 7, further comprising a grouping unit grouping a plurality of picture decoders into a plurality of groups based upon decoding capabilities; and
- the coded data transmitting unit transmits to each of the plurality of groups, each given frame of the plurality of frames suited therefor.

13. A picture coder system including a picture coder coding a plurality of frames of a picture based upon a reference frame when said picture coder is in an inter-frame coding mode, and a plurality of picture decoders each decoding the plurality of frames based upon the reference frame when said picture decoders are in the inter-frame coding mode,
- wherein each of the plurality of picture decoders comprises:
  - a reception unit receiving coded data and a reference frame number from the picture coder,
  - a decoding unit decoding the received coded data using a reference frame designated by the received reference frame number in the inter-frame coding mode, and
  - an acknowledgment unit generating an acknowledgment signal indicating the decoding status and a corresponding frame number of received coded data, the acknowledgment signal representing which of the plurality of frames is actually decoded by a corresponding one of the plurality of picture decoders; and
- the picture coder comprises:
  - an acknowledgment signal receiving unit receiving acknowledgment signals and corresponding frame numbers from picture decoders,
  - a frame memory storing frames and a corresponding frame number for each of the stored frames, the frame memory storing frames actually decoded by the plurality of picture decoders based upon the acknowledgment signals, a frame history storage unit storing history of the decoded frames, an unnecessary frame selection unit judging whether or not each stored frame should be deleted based upon the stored history, an unnecessary frame deletion unit deleting frames from the frame storage means responsive to the unnecessary frame selection unit, a capability estimation unit estimating a decoding capability of the picture decoder based upon the indicated decoding status, a reference frame selection unit selecting a previously stored reference frame in the frame memory using the estimated decoding capability and the frame number of the received coded data, a coding unit coding data and, responsive to selection of a previously stored reference frame, said coding unit coding data using an updated reference frame in the inter-frame coding mode, and a transmitting unit transmitting coded data and an updated reference frame number.

14. A picture coder system as set forth in claim 13, wherein the unnecessary frame deletion unit deletes frames according to decoding capabilities.

15. A picture coder system as set forth in claim 13, wherein the picture coder further comprises a frame weighting unit weighting frame histories, and the unnecessary frame deletion unit deletes frames in weighted order.

16. A picture coder system as set forth in claim 15, wherein the frame weighting unit weights frames based upon decoding capabilities.

17. A picture coder which codes a plurality of frames of a picture based upon a reference frame when said picture coder is in an inter-frame coding mode and transmits the plurality of frames to a plurality of picture decoders which decode the plurality of frames based upon the reference frame when said picture decoder are in the inter-frame coding mode, said picture coder comprising:

an acknowledgment signal receiving unit receiving acknowledgment signals indicating decoding status and receiving a corresponding frame number of received coded data from each of the plurality of picture decoders, wherein each acknowledgment signal represents which of the plurality of frames is actually decoded by a corresponding one of the plurality of picture decoders, a frame memory storing frames and the corresponding frame number for each said frame, the frame memory stores frames actually decoded by the plurality of picture decoders based upon acknowledgment signals, a frame history storage unit storing acknowledgment signal history on the decoded frames and storing data history on frames in the frame memory, an unnecessary frame selection unit judging whether or not the stored frames should be deleted based upon frame history, an unnecessary frame deletion unit deleting frames from the frame storage means responsive to the unnecessary frame selection unit, a capability estimation unit estimating a decoding capability of the plurality of picture decoders based upon the indicated decoding status, a reference frame selection unit selecting a previously stored reference frame in the frame memory using the estimated decoding capability and the frame number of the received coded data, a coding unit coding data responsive to selection of each previously stored reference frame, said coding unit using an updated reference frame in the inter-frame coding mode, and a transmitting unit transmitting coded data and an updated reference frame number.

18. A picture coder as set forth in claim 17, wherein the unnecessary frame deletion unit deletes the frames according to decoding capabilities.

19. A picture coder as set forth in claim 17, further comprising a frame weighting unit weighting histories, wherein the unnecessary frame deletion unit deletes frames in weighted order.

20. A picture coder as set forth in claim 19, wherein the frame weighting unit assigns weights according to decoding capabilities.

* * * * *